Figure 1:
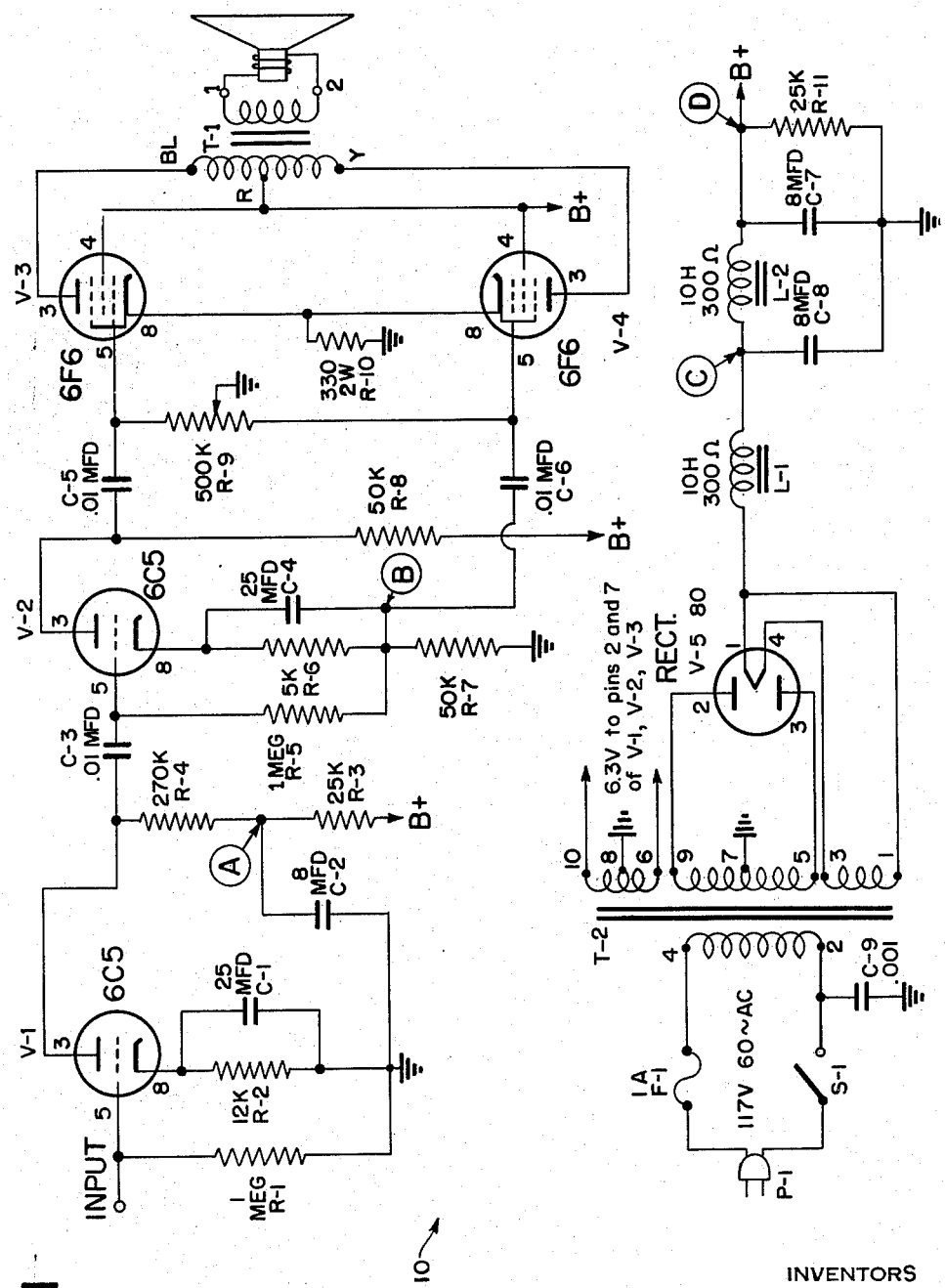

INVENTORS
RICHARD S. NEVILLE
NATHAN ROSEN
BY
ATTORNEYS

Nov. 29, 1960   R. S. NEVILLE ET AL   2,961,777
APPARATUS FOR THE STUDY AND TESTING
PARTICIPANTS OF A STUDY PROBLEM AND
A METHOD OF MAKING SAME
Filed Aug. 30, 1955   4 Sheets-Sheet 3

Trouble

The push-pull amplifier does not operate at all. Absolutely no sound comes from the loud-speaker. Inspection reveals that all the tubes are warm, and there is no obvious physical damage. Locate and replace the part causing the trouble.

21

READ THIS BEFORE YOU BEGIN:

- It is understood that all checks and measurements are made with the proper instrument, correctly used and interpreted. All measurements are from test point to ground, and all voltages are DC—unless otherwise stated.

- Measurements under "Resistance Across Individual Parts" are made with the part completely disconnected. If resistance of a part may be readily determined by tube-pin resistance measurements, it may not be included here. Capacitor resistance checks indicate shorts, or leakage only. Open capacitors can be found only by signal check or replacement.

- Information uncovered in the "Signal" column indicates a normal or no-signal condition at the point indicated with a normal signal injected into the amplifier input.

Remedy 

RESULT OF PART REPLACEMENT

SR= Symptoms Remain
TC= Trouble Corrected

| Part | Result | Part | Result |
|------|--------|------|--------|
| 1.... | ..... | 17.... | ..... |
| 2.... | ..... | 18.... | ..... |
| 3.... | ..... | 19.... | ..... |
| 4.... | ..... | 20.... | TC  /5. |
| 5.... | ..... | 21.... | ..... |
| 6.... | ..... | 22.... | ..... |
| 7.... | ..... | 23.... | ..... |
| 8.... | ..... | 24.... | ..... |
| 9.... | ..... | 25.... | ..... |
| 10.... | ..... | 26.... | ..... |
| 11.... | ..... | 27.... | ..... |
| 12.... | ..... | 28.... | ..... |
| 13.... | ..... | 29.... | ..... |
| 14.... | ..... | 30.... | ..... |
| 15.... | ..... | 31.... | ..... |
| 16.... | ..... | 32.... | ..... |

22   23

FIG. 3a

INVENTORS
RICHARD S. NEVILLE
NATHAN ROSEN
BY
ATTORNEYS

# Symptoms

TEST POINT DATA

| Test Point | | Resistance | Voltage | Signal | |
|---|---|---|---|---|---|
| V-1 | 1 | ~24 | ~25 | ~26 | 1 |
| | 2 | | | | 2 |
| | 3 | | | normal 3 | 3 |
| | 4 | | | | 4 |
| | 5 | | | normal 2 | 5 |
| | 6 | | | | 6 |
| | 7 | | | | 7 |
| | 8 | | | | 8 |
| V-2 | 1 | | | | 1 |
| | 2 | | | | 2 |
| | 3 | | | normal 5 | 3 |
| | 4 | Inf | | | 4 |
| 30— | 5 | 1 meg | | normal 4 | 5 |
| | 6 | Inf | | | 6 |
| | 7 | | | | 7 |
| | 8 | | | | 8 |
| V-3 | 1 | | | | 1 |
| | 2 | | | | 2 |
| | 3 | | | high 11 | 3 |
| | 4 | | | | 4 |
| | 5 | | | normal 7 | 5 |
| | 6 | | | | 6 |
| | 7 | | | | 7 |
| | 8 | | | normal 9 | 8 |
| V-4 | 1 | | | | 1 |
| | 2 | | | | 2 |
| | 3 | | | high 12 | 3 |
| | 4 | | | | 4 |
| | 5 | | | normal 8 | 5 |
| | 6 | | | | 6 |
| | 7 | | | | 7 |
| | 8 | | | normal 10 | 8 |
| V-5 | 1 | | | | 1 |
| | 2 | | | | 2 |
| | 3 | | | | 3 |
| | 4 | | | | 4 |
| T-1 | 1 to 2 | | | no sig. 13 | T-1 |
| | A | | | | A |
| | B | | | normal 6 | B |
| | C | | | | C |
| | D | | +285 1 | | D |

RESISTANCE ACROSS INDIVIDUAL PARTS

| Part | Resistance |
|---|---|
| C-1 | ~27 |
| C-2 | |
| C-3 | |
| C-4 | |
| C-5 | |
| C-6 | |
| C-7 | |
| C-8 | |
| C-9 | |
| R-2 | |
| R-3 | |
| R-5 | |
| R-6 | |
| R-7 | |
| T-1 (BL to R) | |
| T-1 (R to Y) | |
| T-1 (BL to gnd) | |
| T-1 (1 to 2) | Inf 14 |
| T-1 (1 to gnd) | |
| S-1 (ON) | |
| S-1 (OFF) | |
| F-1 | |
| Speaker Coil | |

POWER TRANSFORMER CHECKS

| Test Point | AC Voltage 28 | Resistance 29 |
|---|---|---|
| T-2 1 to 3 | | |
| 5 to 7 | | |
| 7 to 9 | | |
| 6 to 8 | | |
| 8 to 10 | | |
| 6 to 10 | | |
| 2 to 4 | | |
| 1 to gnd (with 1 and 3 disconnected from circuit) | | |
| 5 to gnd (with 5, 7, 9 disconnected from circuit) | | |
| 6 to gnd (with 6, 8, 10 disconnected from circuit) | | |
| 2 to gnd (with 2 and 4 disconnected from circuit) | | |
| 2 to gnd (with 2 and 4 connected to circuit) | | |

20

FIG. 3b ated Nov. 29, 1960

United States Patent Office 2,961,777
Patented Nov. 29, 1960

2,961,777

APPARATUS FOR THE STUDY AND TESTING PARTICIPANTS OF A STUDY PROBLEM AND A METHOD OF MAKING SAME

Richard S. Neville and Nathan Rosen, New York, N.Y., assignors to Van Valkenburgh, Nooger & Neville, Inc., New York, N.Y., a corporation of New York Filed Aug. 30, 1955, Ser. No. 531,476

7 Claims. (Cl. 35—9)

This invention relates to improvements in chart-form apparatus adaptable for instructing or entertaining a person engaged in study problems and for testing and recording the accuracy of his responses as a participant in the solution of such problems; in particular, the invention is concerned with improved and unique combinations of ink formulations applied to charts and methods of printing the charts with the inks, which charts contain answers which the participant is to choose for the purpose of testing the degree of his understanding of the subject matter under study.

One of the invention's purposes is to provide a record of the person's comprehension and analysis by forcing him to leave eivdence of his efforts to deal with the situation, whether those efforts are rightly or wrongly directed. Another purpose is to accomplish the desirable results of an essay answer to an examination question with the same efficiency as attributed to the true or false type.

The invention has to do with producing by means of printing processes a device in chart-form which possesses utilities far transcending those of an item of ordinary printed matter. Its applicability includes, but is not limited to, the fields of education, entertainment and sales promotion or advertising. The invention consists of printing on a sheet, an overlaying transparent and relatively erasure-proof protecting layer, and an erasable or removable opaque covering applied over the protecting layer, so as to obscure the original printing until the erasable covering is removed.

The instant invention represents an improvement over the invention disclosed and claimed in co-pending application Serial Number 376,472 filed August 25, 1953, now Patent No. 2,764,821, by Nathan Buitenkant and assigned to the same assignee. The co-pending application shows an embodiment in which a study problem is outlined on apparatus consisting of a series of related charts. One of the charts is provided with concealed items of information or what has been referred to as answers. After considering the subject matter and the problem outlined, the participant tests his understanding of the problem by selecting and uncovering in succession various items of information which help him to form judgment, leading ultimately to the uncovering of what he expects is the final answer to the study problem. The co-pending application discloses a number of ways of concealing the answers or items of information. For example, it discloses a ribbon of tape which can be scratched away to reveal the selected answers; it also discloses the method of concealing the answers by printing same in invisible ink which when treated by proper solvent, chemical, or exposure to proper light rays, reveals the selected answer; and in another form it discloses an ink covering system, the obscuring part of which can be removed by erasure to expose the concealed answers.

It is the principal object of the instant invention to provide a removable ink system formulation and a method of covering certain printed information with the ink to conceal completely from view the covered information, which covered printed information or selected portions thereof then may be easily exposed to view by erasure of the obscuring ink without obliterating the printed information thus revealed.

It is a further object of the instant invention to provide a removable ink and a method of covering certain printed information on a chart with the ink so that the covered information is completely hidden from view and remains so concealed until the ink covering is removed by erasure or is scratched away.

It is a further object of the instant invention to provide an obscuring ink having excellent hiding qualities and a method of covering paper or other material therewith so that printed information on the paper cannot be read either by shining light through the paper or by reflecting light from its surface.

It is a further object of the instant invention to cover printed matter with an ink covering system comprising a relatively non-removable protective layer of transparent ink and one or more layers of opaque ink for the purpose of concealing the covered printed matter in such a manner that the opaque ink can be removed portion-by-portion for the purpose of exposing to view selected sections of the printed matter without affecting the concealment of the remainder of the covered matter or obliterating the printed matter thus uncovered.

It is a further object of the instant invention to overlay printed answers of an answer chart with an ink covering system comprising, successively, a transparent relatively nonremovable protective intermediate film, a removable size and a removable layer of opaque powder, for the purpose of concealing the covered answers and to permit revealment of selected answers to view by removal of the size and powder overlaying same without affecting the concealment of the remainder of the covered answers or of obliterating the answers uncovered, and it is a further object to use an electrically conducting powder for the opaque layer should the answer chart be designed to accommodate an electrical grading machine.

It is a further object of the instant invention to cover printed matter with multiple layers of ink wherein the underneath layer, a relatively non-removable protective coating, prevents obliteration of the covered printed matter upon the removal of the upper layer or layers of opaque coatings which conceal the printed matter from view until so removed.

It is a further object of the instant invention to provide an ink formulation and a method of applying same to printed matter whereby large quantities of study problem charts can be manufactured by conventional printing techniques with the assurance that the objects hereinbefore stated will be realized.

Figure 2:
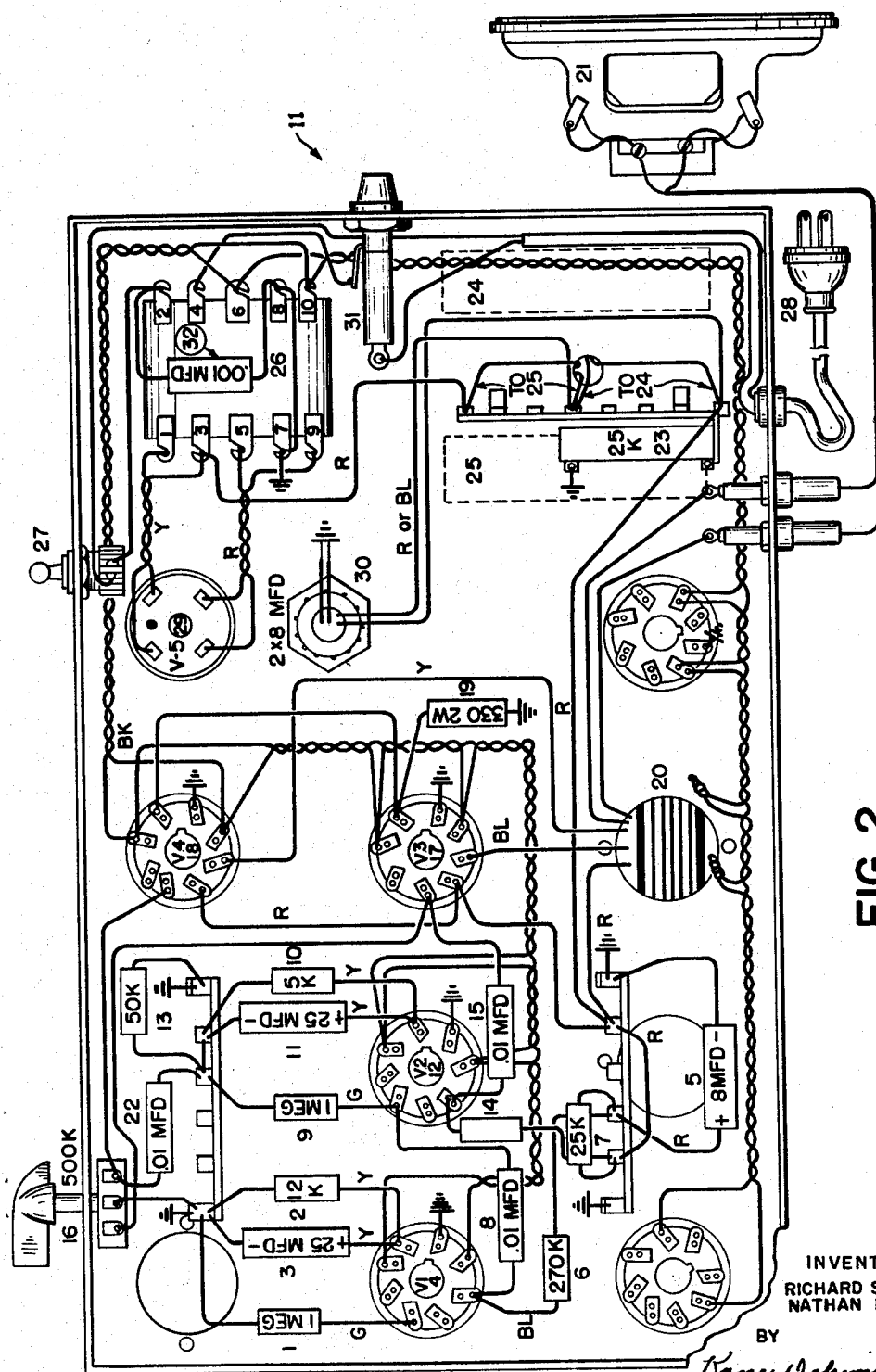

Other objects and advantages will be apparent from the following description and accompanying figures in which:

Fig. 1 is a reproduction of a chart showing a schematic diagram of electronic apparatus which is the subject matter of the illustrated study problem;

Fig. 2 is a reproduction of a chart showing a wiring diagram of illustrated electronic equipment which is background information for a study problem under consideration; and Figs. 3a and 3b are reproductions of a printed chart setting forth the problem to be considered by the student together with columns of answers or other items of information, covered by opaque ink, from which correlated tabular information the student will select what he thinks is the needed answer or answers by erasing the opaque covering in order to expose the answers so selected.

Referring now to the drawing, Figs. 1, 2, 3a and 3b illustrate a typical application or embodiment of the improvements. A study problem is disclosed concerning electronic equipment. The apparatus consists of a series of related charts 10, 11 and 20. The charts are designed to help a student learn the theory and operation of and how to repair a push-pull amplifier. Charts 10, 11 and 20 may be used by a single student during his home study or by a group of students each having his own chart as part of a classroom exercise.

The ideal condition for teaching a person the theory and operation of electronic equipment, for example, a push-pull amplifier, and in addition, how to troubleshoot the equipment, requires among other things that the real equipment under study be available to be worked on by the student while he has the full attention of an instructor. However, there is a limit to both the number of specimen electronic equipments and teachers that can be provided for training and instructional purposes.

In lieu of such assistance to the trainer, the improvements as incorporated on charts 10, 11 and 20 are designed to simulate realistically the equipment under study and the reinforcing actions of an instructor. For example, chart 10 is a schematic diagram of the push-pull amplifier. The amplifier equipment is in turn represented by the wiring diagram of chart 11. It will be noted that the chart 11 reproduces realistically the view which would be observed by the student were he to turn the amplifier over and examine the exposed wired circuit. For a more complex piece of equipment, the charts are usually supplemented by another chart showing a pictorial view of the equipment; such a view is shown in the co-pending application but not here because of the simple nature of the push-pull amplifier circuit.

In using the charts for the purpose of instruction, a prepared problem 21 is printed on chart 20. In order to answer problem 21, the student must call upon his knowledge of the theory of operation of the apparatus. He also has to make use of chart 11 as if it were the actual equipment under study and to be repaired. The use of these charts presupposes that the student has already covered the theory of push-pull amplifiers.

The instant invention will be understood better if the illustrated problem 21 is worked out in the same manner expected of the student. Chart 20 is provided with a number of columns of printed answers 22 through 29 hidden from view by removable ink coverings. The printed answers are prearranged to correlate the equipment under study with problem 21. Tabular information in the nature of the headings of each column and the symbols or reference numbers alongside each covered answer correlates same with the information set forth on the charts 10 and 11.

From the statement of problem 21, ", . . . all the tubes are warm . . ," the student should understand that all tubes are drawing filament current. This eliminates any reason to suppose that there is trouble in the line cord, fuse or power switch. To simulate the measuring of B+ voltage the student will determine the points across which he will connect his D.C. voltmeter. From chart 10, the D.C. voltage can be checked at pins 3 or 4 of tubes V–3 or V–4. The voltage can also be measured across resistor R–11 from test point D to ground. To measure the D.C. voltage from D to ground, the student will locate point D along the voltage column 25 since it is voltage that is being measured. The ink covering is removed, for example, by stylus or pencil eraser. The uncovered data reads +285. The student writes number 1 alongside the column 25 at reference D to show that this was his first step. By showing the sequence of steps in finding the solution the student shows not only his answer but also the manner in which he developed same. This permits more accurate evaluation and grading of the student. The uncovered answer of +285 means that the voltmeter reading is 285 volts, and accordingly the power supply is operating properly.

Now assume that the student will next decide to trace the signal starting from the input side of the amplifier until he uncovers the trouble. The student simulates the checking of the input signal at grid 5 of tube V–1 by erasing alongside the reference number 5 of V–1 of column 26. He also writes the number 2 alongside to show that this was his second step. The uncovered response is normal. This means that the signal is getting to this point and that the student should search further. The third step is the plate pin 3 of tube V–1 and upon erasure at reference number 3 of V–1 of column 26 he again finds the response is "normal." He also shows that this is his third step by marking 3 alongside. The next point to check is the grid of V–2 (pin 5), which also shows up a "normal." The fifth and sixth checks will be the outputs of the phase inverter stage of the amplifier. These are, respectively, pin 3 and test point B of tube V–2. Both are found to be "normal." Next the student checks the push-pull amplifier stage which requires the additional steps of seven to twelve. Steps eleven and twelve reveal that the signal is "high" at the plates of V–3 and V–4. This shows an abnormal situation. A proficient student will next check the secondary of the output transformer T–1. A check here will reveal that no signal, "no sig.," is coming through. The sound-reasoning student would first prove to himself that the transformer is faulty before replacing same. Therefore he checks the resistance across the transformer output, note step fourteen at column 27. The answer is infinite, "inf.," which tells him that there is an open in the secondary and explains the trouble. His next step is to replace the transformer. By the use of chart 11, the student learns that that transformer is part reference number 20. Erasure at reference number 20, column 23, which is his fifteenth step, means that the student has simulated the replacement of the transformer. The uncovered answer or response shows that the student corrected the trouble, and in addition such answer or response acts as the instructor by telling the student that his answers and his mode of correcting the trouble is correct.

In the illustrative example worked out hereinbefore, a minimum of reasonable steps were taken to arrive at the solution. A student could have taken many more steps, some of which would have had no value or be of little assistance in locating the trouble. Note, for example, the uncovered answers 30 of column 24, which answers are uncovered solely for illustrative purposes. Other uncovered answers may have confirmed what he already discovered by the answers uncovered above. To function properly, the answer chart 20 must at the start have all its answers covered so that they are not discernible under any circumstance until the covering is erased. It is the essence of the instant invention to provide ink formulations which accomplish this object. Furthermore, the opaque ink must be of such character that it can be removed portion-by-portion, so that only the selected and individual answer is exposed to view without removing or disturbing the covering of the adjacent answers above and below the selected answer. Note, for example, the exposed answer, "high," step 12 in column 26. The answers next above and next below, having reference numbers 2 and 4 respectively, are hidden from view because the ink covering thereon is still intact. Furthermore, the opaque ink has to have perfect hiding qualities to prevent the student from seeing the answers before erasure. Otherwise, chart 20 will have little value for instructional or test purposes if it gives the answers away. Moreover, it is seen, upon removal of the opaque ink covering, that the printed answers are readable and not in any way obliterated by the erasure.

To achieve the objects hereinbefore noted, chart 20 is printed with its column of answers, reference numbers and other sundry information on relatively opaque and uniform quality paper. After printing the column of answers 22 through 29 on chart 20, the answers are then covered by a layer of special, relatively non-removable, protective and transparent ink referred to hereinafter also as the intermediate film. The uniform quality paper encourages an even deposition of the protective ink over the answers. The opaqueness of the paper contributes to hiding the answers. A removable film of opaque ink is then applied over the intermediate film; the opaque film serves to hide the answers from view. The protective ink coating, on the other hand, is transparent to permit one to read the selected answers upon removal of the overlaying opaque film.

The layer of protective ink is applied evenly and uniformly over the columns of answers 22 through 29 by conventional printing methods. The answers are printed in straight columns to simplify the application of the intermediate and opaque films on chart 20. Were the answers irregularly dispersed over the paper it would be relatively more difficult to apply uniform ink films over the dispersed answers. The layer of protective film is permitted to dry to a suitable hardness before the opaque film is applied thereover by conventional overprinting technique. The intermediate ink contemplated by the instant invention is so formulated as to give maximum protection to the answers consistent with easy overprinting by the opaque film. In other words, the protective film should be sufficiently hard to become relatively non-removable to protect the printed matter thereunder from obliteration when the overprinted opaque ink is being rubbed away. In addition, the formulation and hardness of the protective film are deliberately designed to permit the overprinting of same with the opaque film by conventional printing techniques.

After suitable drying of the intermediate film, the protected answers are then treated with one or more layers of opaque ink. The thickness of the opaque coating in part determines the hiding qualities of the ink. It is likely that the thickness of opaque film required to yield the desired hiding qualities may be too great to permit overprinting by a single application of opaque ink. In this case, two or more thinner layers of opaque ink may be applied over the intermediate film subject to proper drying intervals therebetween until the desired thickness is reached.

The intermediate film is an ink having the following formulation: five to fifty percent of pigment; forty to eighty-five percent of vehicle; five to ten percent of non-offsetting compound; and a small but effective amount of drier. The pigment may consist of any of the pigments commonly used in the preparation of transparent printing inks; this includes both colored pigments as well as colorless extender pigments. Wherever percent or parts of ingredients are specified herein, it is meant to refer to parts by weight.

The vehicle serves to permit the ink to be worked on a press and includes by part: thirty to fifty-seven percent of any of the natural or synthetic drying oils, such as linseed, dehydrated castor, oiticica, alkyd; combined with twenty-five to fifty percent of natural or synthetic resins, which resins can be any of the following; modified phenolic, maleic, estergum, coumar (also known in the art as coumarene-indene), rosin, copals; and the balance essentially solvent having the range usually about fifteen to about thirty percent by part of solvent, which may be any of the higher boiling petroleum solvents whose boiling points fall in the range of 450 degrees to 650 degrees Fahrenheit.

The compound serves to prevent the printed sheets of paper as they are released from the press from sticking together and may consist of any vegetable wax such as carnauba or mineral wax such as micro-crystalline or paraffine wax dissolved in any suitable oil which may be any one of those mentioned above. The drier serves as an oxidation catalyst and may consist of any of the fatty or organic acid salts of cobalt, manganese or lead or combinations thereof.

The opaque film has the following composition; about twenty to about sixty-five percent of vehicle; about five to about ten percent of compound; a small but effective amount of driers; and the balance essentially pigment. The pigment may consist of titanium dioxide, aluminum powder or other opacifying pigments either alone or in combination. Any suitable organic or inorganic colored pigment may be added to the opacifying pigments and dispersed to form a paste-like material. The vehicle, compound and driers are the same as that used for the intermediate film.

The formulations set forth above are adaptable for conventional letter press or lithographic off-set printing and give the ink manufacturer sufficient leeway in making the ink to fit specific printing requirements. A specific example of an intermediate ink formulation for letter press printing consists of the following:

| Ingredient: | Percent |
|---|---|
| Oiticia oil | 7.5 |
| Bodied linseed oil, 60 poise | 19.0 |
| Refined linseed oil | 18.0 |
| Modified phenolic resin, melting point 130 to 140 degrees centigrade | 23.0 |
| Petroleum solvent 500 to 550 degrees boiling point, Fahrenheit | 10.0 |
| Cobalt linoresinate, 4 percent metal | 1.0 |
| Lead-manganese paste drier | 1.0 |
| Benzidine yellow | 12.5 |
| Compound consisting of 70% by part of linseed, 25% by part of wax, 4% by part of cup grease, and 1% by part of corn starch | 8.0 |

A specific example of an opaque ink formulation for letter press printing, silver color, consists of the following ingredients:

| Ingredient: | Percent |
|---|---|
| Copal modified phenolic resin | 9.5 |
| Oiticica oil | 6.5 |
| Bodied linseed oil, 150 poise | 37.0 |
| Refined linseed oil | 8.0 |
| Cobalt linoleate, 2½% metal | 1.5 |
| Kerosene | 4.0 |
| Carnauba wax | 1.0 |
| Aluminum paste | 31.0 |
| Compound consisting of 70% by part of refined linseed, 25% by part of wax, and 5% by part of corn starch | 1.5 |

A specific example of an opaque blue letterpress ink formulation consists of the following ingredients:

| Ingredient: | Percent |
|---|---|
| Bodied linseed oil, 150 poise | 6.0 |
| Bodied linseed oil, 60 poise | 7.5 |
| Bodied linseed oil, 2 poise | 7.5 |
| Titanium dioxide | 35.0 |
| Flushed alkali blue toner | 26.0 |
| Aluminum paste | 13.0 |
| Cobalt linoresinate, 4% metal | 4.0 |
| Corn starch | 1.0 |

The application of a relatively hard, transparent and non-removable intermediate ink film overlaid by one or more layers of removable opaque ink is not restricted to letterpress or lithographic off-set printing. The inks may be applied to the paper by other conventional printing processes such as: gravure printing, flexographic printing and silk screen printing.

For gravure printing, the prescribed general ink formulations for both the intermediate ink and the opaque ink may be the following:

| Ingredient: | Percent |
|---|---|
| Pigment | 20 to 40 |
| Plasticizer | 0 to 10 |
| Vehicle | 30 to 50 |
| Solvent | 10 to 20 | wherein the pigment may be of the transparent colorless or colored types for the intermediate film, and for the opaque ink film, may consist of titanium dioxide, aluminum powder or other opacifying pigments either alone or in combination with any suitable organic or inorganic colored pigments; and wherein the vehicle is a solvent solution of natural or synthetic resin in combination with a suitable polymeric film former.

The plasticizer serves to maintain the overlaying ink films sufficiently soft to prevent them from becoming too brittle and thus flaking off the charts while the charts are being handled. The vehicle for the intermediate film should accent the tougher polymeric films to obtain the relatively hard overlayer of ink that would resist removal upon the erasure of the opaque film overlaying same. For the opaque film, the vehicle therefor should stress the softer resins to insure facile removal upon erasure.

For flexographic printing, the prescribed general ink formulations for both the intermediate ink and the opaque ink may be the following:

| Ingredient: | Percent |
|---|---|
| Pigment | 30 to 50 |
| Plasticizer | 0 to 5 |
| Vehicle | 40 to 60 |
| Solvent | 10 to 20 | wherein the pigment may be of the transparent colorless or colored types for the intermediate film, and for the opaque ink film, may consist of titanium dioxide, aluminum powder or other opacifying pigments either alone or in combination with any suitable organic or inorganic colored pigments; and wherein the vehicle is a solvent solution of natural or synthetic resin in combination with a suitable polymeric film former.

The plasticizer serves to maintain the overlaying ink films sufficiently soft to prevent them from becoming too brittle and thus flaking off the charts while the charts are being handled. The vehicle for the intermediate film should accent the tougher polymeric films to obtain the relatively hard overlayer of ink that would resist removal upon the erasure of the opaque film overlaying same. For the opaque film, the vehicle therefor should stress the softer resins to insure facile removal upon erasure.

For the silk screen printing, the prescribed general ink formulations for both the intermediate ink and the opaque ink may be the following:

| Ingredient: | Percent |
|---|---|
| Pigment | 20 to 40 |
| Plasticizer | 0 to 10 |
| Vehicle | 30 to 50 |
| Solvent | 15 to 30 |
| Bodying compound | 0.5 to 3 | wherein the pigment may be of the transparent colorless or colored types for the intermediate film, and for the opaque ink film, may consist of titanium dioxide, aluminum powder or other opacifying pigments either alone or in combination with any suitable organic or inorganic colored pigments; and wherein the vehicle is a solvent solution of natural or synthetic resin in combination with a suitable polymeric film former.

The plasticizer serves to maintain the overlaying ink films sufficiently soft to prevent them from becoming too brittle and thus flaking off the charts while the charts are being handled. The vehicle for the intermediate film should accent the tougher polymeric films to obtain the relatively hard overlayer of ink that would resist removal upon the erasure of the opaque film overlaying same. For the opaque film, the vehicle therefor should stress the softer resins to insure facile removal upon erasure.

A bodying compound is added as a constituent of the screen ink formulations for the purpose of sharpening the outlines of the ink films printed by this process. With respect to choosing transparent or opaque pigments and relatively hard or soft constituents for the vehicles, the same requirements apply for flexographic and silk screen printing as stated with respect to gravure printing.

Should the situation arise in which answer charts incorporating the instant invention are to be used for the purpose of examining and/or testing a large body of trainees, for example, any school having a large enrollment or a military training base having thousands of trainees, the grading of papers would normally require a fairly large number of persons to grade same if the job is to be accomplished within a reasonable length of time. It would be keeping within the principle of the instant invention to prepare answer charts in such a manner to avoid this cumbersome aspect of large scale examinations.

To save both time and grading personnel, the answer charts can be designed to accommodate commercially available, automatic and electrical grading machines. With this in mind, the answer charts are designed so that after being used by the trainee, the charts are referred to the automatic machines for marking, grading and the recording of same. Use of automatic marking machines requires that the opaque film be highly electrically conductive. The machine will grade the charts by passing a series of electrical bearing contact fingers over the opaque film. When the contact finger strikes an exposed answer, its electrical circuit is broken because at that point the electrically conductive opaque film has been removed by erasure, and the intermediate film by its nature is non-conductive. The machine thus records a response whenever the circuit is broken.

The description hereinafter will consider the manufacture of answer charts with a layer of conductive opaque ink film to permit grading by automatic machines. The conductive opaque ink film consists of finely divided metallic powder, such as bronze powder adhering to a suitable size. The intermediate ink may be of the type described hereinbefore and may be applied to the chart by any suitable printing process, such as those described hereinbefore. After suitable drying, the intermediate film is then overlaid with a size by any suitable printing process, such as, letterpress, off-set or silk screen. The size or glue is formulated so as not to interfere unduly with the conductive functions of the metallic powder and, in addition, so as to be easily and completely removed by the rubbing off by an erasure or stylus applied thereover. Immediately after the size is applied, a finely divided opaque powder is dusted on the answer chart. The powder adheres only to those portions of the sheet printed with size or glue. The excess is removed. The pigment for the dusting powder is chosen to have a degree of opacity to hide completely the printed information overlayed thereby. The pigment must be a powder which is electrically conductive, such as bronze powder.

The general formulation for the size used for a bronze powder will consist of the following:

| Ingredient: | Percent |
|---|---|
| Pigment | 20 to 30 |
| Vehicle | 40 to 60 |
| Compound | 5 to 15 |
| Drier | 3 to 6 |

The pigment for the size may consist of any of the pigments commonly used in the preparation of printing inks. This includes both colored pigments as well as colorless pigment extenders. The vehicle for the size will consist of 40 to 70 percent of any of the natural or synthetic drying oils, 25 to 55 percent of the natural or synthetic resins, and 5 to 10 percent of solvent. The solvent may be any of the higher boiling petroleum solvents whose boiling points fall within the range of 350 to 550 degrees Fahrenheit. The vehicle must possess the property of not penetrating into the surface of the paper in order to insure a tacky surface on which the dusting bronze powder will adhere. The pigment aids in promoting varnish nonpenetration or hold-out. The compound, which serves, among other things, to prevent the size from penetrating the paper and the drier are of types previously described in connection with letterpress and lithographic ink films. It should be understood that the process of dusting an opaque powder on the size need not be limited to the manufacture of answer charts designed to accommodate grading by electrical machines. For example, it is entirely within the principle of the instant invention to use a relatively non-conducting opaque powder where grading by machine is not desired.

Although the invention has been described in terms of a study problem for electronic apparatus, the invention is applicable to any system of charts, or apparatus made of paper or other base in which information originally covered is to be uncovered by the person using the apparatus either as part of a game or a study program. It is therefore intended that the matter set forth herein be treated as illustrative and not in a limiting sense.

What is claimed is:

1. A process for manufacturing apparatus containing responses which are temporarily concealed from revelation by transmitted and reflected light and which can be selectively exposed to view comprising providing a supporting sheet, printing responses on said sheet thus providing a sheet displaying responses having surface characteristics different from the surface characteristics of the environment immediately surrounding the responses, overlaying the responses and the environment immediately surrounding the responses with a transparent barrier layer resistant to erasure and formed of an ink containing a vehicle and a pigment, and finally applying over the barrier layer a concealing layer of an erasable opaque ink, said pigment-containing barrier layer imparting similar surface characteristics to both the responses and the environment immediately surrounding the responses whereby the specular and diffuse reflectance of the covering layer over both the responses and the environment immediately surrounding the responses are substantially similar.

2. A process for manufacturing apparatus containing responses which are temporarily concealed from revelation by transmitted and reflected light and which can be selectively exposed to view as set forth in claim 1 in which the erasable opaque ink is electrically responsive.

3. A process for manufacturing apparatus containing responses which are temporarily concealed from revelation by transmitted and reflected light and which can be selectively exposed to view as set forth in claim 1 in which the erasable opaque ink is electrically responsive and is formed by applying a tacky size over the barrier layer and thereafter overlaying said size with an electrically responsive opaque powder.

4. A process for manufacturing apparatus containing responses which are temporarily concealed from revelation by transmitted and reflected light and which can be selectively exposed to view comprising providing a supporting sheet, printing responses on said sheet thus providing a sheet displaying responses having surface characteristics different from the surface characteristics of the environment immediately surrounding the responses, overlaying the responses and the environment immediately surrounding the responses with a transparent barrier layer resistant to erasure and formed of an ink containing a vehicle and between 5% and 50% of pigment, and finally applying over the barrier layer a concealing layer of an erasable opaque ink, said pigment-containing barrier layer imparting similar surface characteristics to both the responses and the environment immediately surrounding the responses whereby the specular and diffuse reflectance of the covering layer over both the responses and the environment immediately surrounding the responses are substantially similar.

5. Apparatus containing responses which are temporarily concealed from revelation by transmitted and reflected light and which can be selectively exposed to view comprising a backing sheet, printed responses on said sheet having surface characteristics different from the surface characteristics of the environment immediately surrounding the responses, a transparent barrier layer resistant to erasure disposed over said responses and the environment immediately surrounding the responses and formed of an ink containing a vehicle and a pigment, and an opaque concealing layer formed of an erasable opaque ink removable section by section disposed over the transparent barrier layer, said pigment-containing barrier layer imparting similar surface characteristics to the responses and the environment immediately surrounding the responses whereby the specular and diffuse reflectance of the concealing layer over both the responses and the surrounding environment are substantially similar.

6. Apparatus containing responses which are temporarily concealed from revelation by transmitted and reflected light and which can be selectively exposed to view as set forth in claim 5 in which the erasable opaque concealing layer is electrically responsive.

7. Apparatus containing responses which are temporarily concealed from revelation by transmitted and reflected light and which can be selectively exposed to view comprising a backing sheet, printed responses on said sheet having surface characteristics different from the surface characteristics of the environment immediately surrounding the responses, a transparent barrier layer resistant to erasure disposed over said responses and the environment immediately surrounding the responses and formed of an ink containing a vehicle and between 5% and 50% of pigment, and an opaque concealing layer formed of an erasable opaque ink removable section by section disposed over the transparent barrier layer, said pigment-containing barrier layer imparting similar surface characteristics to the responses and the environment immediately surrounding the responses whereby the specular and diffuse reflectance of the concealing layer over both the responses and the surrounding environment are substantially similar.

References Cited in the file of this patent

UNITED STATES PATENTS

| 2,132,931 | Bohn | Oct. 11, 1938 |
| 2,179,168 | Alexander | Nov. 7, 1939 |
| 2,683,094 | Jones et al. | July 6, 1954 |
| 2,764,821 | Buitenkant | Oct. 2, 1956 |

OTHER REFERENCES

Text: Aluminum Paint and Powder (Edwards), Reinhold Publishing Co. 1936.